United States Patent
Krahnstoever et al.

(10) Patent No.: US 6,996,460 B1
(45) Date of Patent: Feb. 7, 2006

(54) METHOD AND APPARATUS FOR PROVIDING VIRTUAL TOUCH INTERACTION IN THE DRIVE-THRU

(75) Inventors: Nils Krahnstoever, Albany, NY (US); Emilio Schapira, State College, PA (US); Rajeev Sharma, State College, PA (US); Namsoon Jung, State College, PA (US)

(73) Assignee: Advanced Interfaces, Inc., State College, PA (US)

( * ) Notice: Subject to any disclaimer, the term of this patent is extended or adjusted under 35 U.S.C. 154(b) by 191 days.

(21) Appl. No.: 10/679,226

(22) Filed: Oct. 2, 2003

Related U.S. Application Data

(60) Provisional application No. 60/415,690, filed on Oct. 3, 2002.

(51) Int. Cl.
*G06F 17/00* (2006.01)

(52) U.S. Cl. ............................. 701/1; 701/2; 701/207; 715/863

(58) Field of Classification Search .................. 701/1, 701/2, 207, 208; 715/863; 345/157, 173, 345/158; 382/48, 42, 16; 705/15, 26, 36; 340/706, 709
See application file for complete search history.

(56) References Cited

U.S. PATENT DOCUMENTS

| | | | |
|---|---|---|---|
| 4,392,119 A | 7/1983 | Price et al. ................ 340/38 L |
| 4,638,312 A * | 1/1987 | Quinn et al. ................. 340/5.9 |
| 4,675,515 A * | 6/1987 | Lucero ........................ 235/381 |
| 4,735,289 A * | 4/1988 | Kenyon ........................ 186/37 |
| 4,862,639 A | 9/1989 | Leach et al. .................. 49/122 |
| 4,884,662 A | 12/1989 | Cho et al. ..................... 186/36 |
| 4,975,960 A | 12/1990 | Petajan ......................... 381/43 |
| 5,012,522 A | 4/1991 | Lambert ........................ 382/2 |
| 5,128,862 A * | 7/1992 | Mueller ....................... 705/15 |
| 5,168,354 A | 12/1992 | Martinez et al. .............. 358/93 |
| 5,235,509 A | 8/1993 | Mueller et al. ............. 364/405 |
| 5,353,219 A | 10/1994 | Mueller et al. ............. 364/405 |
| 5,636,463 A | 6/1997 | Sharon et al. ................ 40/618 |
| 5,715,325 A | 2/1998 | Bang et al. ................. 382/118 |

(Continued)

OTHER PUBLICATIONS

U.S. Appl. No. 60/369,279, Sharma, filed Apr. 2, 2002.

(Continued)

*Primary Examiner*—Tan Q. Nguyen

(57) ABSTRACT

The present invention is a method and apparatus for providing an enhanced automatic drive-thru experience to the customers in a vehicle by allowing use of natural hand gestures to interact with digital content. The invention is named Virtual Touch Ordering System (VTOS). In the VTOS, the virtual touch interaction is defined to be a contact free interaction, in which a user is able to select graphical objects within the digital contents on a display system and is able to control the processes connected to the graphical objects, by natural hand gestures without touching any physical devices, such as a keyboard or a touch screen. Using the virtual touch interaction of the VTOS, the user is able to complete transactions or ordering, without leaving the car and without any physical contact with the display. A plurality of Computer Vision algorithms in the VTOS processes a plurality of input image sequences from the image-capturing system that is pointed at the customers in a vehicle and performs the virtual touch interaction by natural hand gestures. The invention can increase the throughput of drive-thru interaction and reduce the delay in wait time, labor cost, and maintenance cost.

20 Claims, 9 Drawing Sheets

U.S. PATENT DOCUMENTS

| | | | | |
|---|---|---|---|---|
| 5,845,263 | A | * | 12/1998 | Camaisa et al. ............... 705/27 |
| 5,937,386 | A | | 8/1999 | Frantz ............................ 705/1 |
| 5,969,968 | A | * | 10/1999 | Pentel ......................... 705/26 |
| 6,026,375 | A | | 2/2000 | Hall et al. ..................... 705/26 |
| 6,184,926 | B1 | | 2/2001 | Khosravi et al. ........... 348/239 |
| 6,191,773 | B1 | * | 2/2001 | Maruno et al. ............. 345/158 |
| 6,283,860 | B1 | * | 9/2001 | Lyons et al. ................... 463/36 |
| 6,301,370 | B1 | | 10/2001 | Steffens et al. ............. 382/103 |
| 6,404,900 | B1 | | 6/2002 | Qian et al. .................. 382/103 |
| 6,434,255 | B1 | * | 8/2002 | Harakawa ................... 382/103 |
| 6,498,628 | B2 | * | 12/2002 | Iwamura ..................... 348/734 |
| 6,788,809 | B1 | * | 9/2004 | Grzeszczuk et al. ........ 382/154 |
| 2001/0002467 | A1 | | 5/2001 | Ogo ............................... 705/1 |

OTHER PUBLICATIONS

U.S. Appl. No. 60/399,246, Sharma, filed Jul. 29, 2002.
U.S. Appl. No. 60/402,817, Sharma, filed Aug. 12, 2002.
Harville, Gordon & Woodfill, Proc. of IEEE Workshop on Detection & Recpgnition, Jul. 2001.
R. Jain and R. Kasturi, Machine Vision, McGraw-Hill, 1995.
Krahnstoever, Kettebekov, Yeasin, & Sharma, Dept. of Comp. Science & Eng. Tech Rprt, 2002, month is not available.
Osuna, Freund & Girosi, Proc. IEEE Conf. Comp. Vision & Pattern Recognition pp 130-137 1997, month is not available.
Ridder, Munkelt & Kirchner, ICRAM 95 UNESCO Chair on Mechatronics, 193-199, 1995, month is not available.
Rowley, Baluja, & Kanade, IEEE Trans. Pattern Analysis & Machine Intelligence, vol. 20, No. 1 1998, month is not available.
Sharma, Pavlovic' & Huang, Proc. of IEEE 86(5): 853-869 May 1998.
Stauffer & Grimson, Comp. Vision & Pattern Recognition, vol. 2, pp 246-253, Jun. 1999.
Yang, Kriegman & Ahuja, IEEE Trans. Pattern Analysis & Machine Intelligence, vol. 24, No. 1, Jan. 2002.

* cited by examiner

METHOD AND APPARATUS FOR PROVIDING VIRTUAL TOUCH INTERACTION IN THE DRIVE-THRU

CROSS-REFERENCE TO RELATED APPLICATIONS

This application is based on and claims priority to U.S. Provisional Application No. 60/415,690, filed Oct. 3, 2002, which is fully incorporated herein by reference.

FEDERALLY SPONSORED RESEARCH

Not Applicable

SEQUENCE LISTING OR PROGRAM

Not Applicable

BACKGROUND OF THE INVENTION—FIELD OF THE INVENTION

The present invention is a method and apparatus for providing an enhanced automatic drive-thru experience to customers in a vehicle with a virtual touch interaction by natural hand gesture with digital information, while efficiently increasing the throughput of the drive-thru interaction and reducing the delay in wait time, labor cost, and maintenance cost. The present invention provides a 'contact free' method for performing the virtual touch interaction, by means of an analysis of images from image-capturing sensors, such as video cameras, that are oriented towards the user.

BACKGROUND OF THE INVENTION

One of the prior arts for the drive-thru system involves one or more people in the store interacting with the driver of the vehicle remotely. This interaction is commonly performed by means of a two-way speaker and microphone, with a window where a person is waiting to attend the user. Inconsistent speed, accuracy and customer experience, which can occur throughout the traditional drive-thru process, pose unique challenges for corporate planners. The length of queue, the appearance of the menu board, delay of initial greeting, speaker clarity, communication between the consumer and the order taker, communication between the order taker and order fulfillment, the payment process, order delivery and accuracy are all critical stages in delivering the customer experience. Miscommunications due to language barriers, speaker or microphone malfunction, or just plain poor attitudes can combine to create a very unpleasant customer experience. Re-engineering of the drive-thru process must take place if they are expected to keep pace with the increasing demand and desires of the general public.

This traditional drive-thru system has inherent inefficiency of wait time in the interaction process. In order to solve this problem, some approaches have been attempted. For example, the three-window idea, one window each for ordering, payment, and pick-up, has been widely used in the quick-service restaurant, and it could decrease the inefficiency to some degree. However, this method results in having more attendants with the three windows and relevant building construction cost. This method is also not easily adaptable to the other type of drive-thru interaction process than that of the quick-service restaurant. For example, the drive-thru bank will not need three-windows for its transaction.

U.S. Pat. No. 6,026,375 of Hall et al. disclosed a method and apparatus for processing orders from customers in a mobile environment, trying to provide a solution for the inefficiencies of the drive-thru. While they have interesting and versatile approaches to the drive-thru process, the customers in the vehicle need to have mobile access to the network, which could require extra cost and burden to the customer. Unless enough people within the local area have mobile access to the network mentioned in the U.S. Pat. No. 6,026,375 of Hall et al., there is a possibility that the network might not be utilized. Also, signals of mobile access, such as cell phones, weaken, depending upon the location, weather condition, etc. Hence, the reliability of such a system is a question. Finally, since the interface is not natural (i.e., the user has to select from a large menu using the alpha-numeric keypad), there are issues of delay.

U.S. Pat. No. 5,168,354 of Martinez et al. disclosed a fast food drive-thru video communication system. While this approach tries to improve the drive-thru interaction using the video communication system in addition to the conventional voice only drive-thru system, allowing the customer to maintain eye-to-eye visual contact with the attendant located within the restaurant, the approach is still not able to solve the delay of interaction problem for the plurality of customers and vehicles.

U.S. Pat. No. 4,884,662 of Cho et al. disclosed a method of operating a driver interaction service center with a plurality of collection stations for dispensing services, and a plurality of driveways. While the suggested method increases the throughput of the interaction process, it also results in hiring more attendants or order-takers for each station, thus increasing labor costs.

Using the automatic systems, such as a touch screen system or a keypad with a digital display, which is, for example, commonly embodied in automatic teller machines, could reduce the labor costs. However, these systems result in maintenance and hygiene issues since the drivers touch the system physically. The touch-screen display is fixed and, therefore, cannot adapt to the various sizes of vehicles and arm lengths of people. This would be devastating to the fast food drive-thru industry with the increase in order time alone. This also causes difficulty in parking the vehicle, as it needs to be close to the system as possible in order for the driver to be able to touch the screen, stretching the hand to the device. This is ergonomically inappropriate because it is not only uncomfortable to the driver but also could cause damage to the system. If the driver has to step out of the vehicle to use the automatic systems, this will result in more delay and inconvenience to the customer. Other solutions include a device that the user can put inside the vehicle, such as a keypad, or track ball; however, these also involve disadvantages of hygienic issues and durability.

The present invention is named Virtual Touch Ordering System (VTOS). The VTOS can overcome the limitations of these prior art drive-thru systems and provide improved automatic drive-thru experience to the customers with convenient interface and digital information while efficiently increasing the throughput of the drive-thru interaction and profitability. The present invention provides a 'contact free' method for performing the interaction, by means of an analysis of images from image-capturing sensors, such as video cameras, that are oriented towards the user.

Virtually no human labor is necessary in taking orders or making most transactions with the VTOS, since it is a fully automated system. In the case of some transactions where human involvement is indispensable, such as certain kind of bank transaction, the VTOS can reduce the number of attendants greatly, thus reducing overall drive-thru labor costs. Reducing maintenance costs could be one of the big advantages in the VTOS drive-thru system. The nature of virtual touch capability of the VTOS avoids the wear and tear losses of the system, thus reducing the maintenance cost over time. The virtual touch interaction capability also enhances the customer experience by allowing more customized interaction. The VTOS can provide easy to learn graphical user interface for the digital contents.

SUMMARY

In an exemplary embodiment, the VTOS can be comprised of a housing (enclosure), a plurality of the image-capturing system, a display system, a processing and controlling system, a lighting system, a drive-thru ceiling structure, and a sound system (hidden in the enclosure). The processing and controlling system is connected to the image-capturing system, the display system, and the sound system. The image-capturing system is defined to be a system with plurality of image-capturing devices, such as cameras, frame grabbers and all relevant peripherals, in the VTOS. Lighting system and drive-thru ceiling structure help the VTOS to process the user detection and the contact-free interaction by helping computer vision technology operate more reliably. The lighting system and the drive-thru ceiling structure is not the essential part of the VTOS, but they belong to the VTOS as the environmental set up, in a broader concept.

Generally the implementation of the VTOS makes transitions within a series of interaction states, which are listed as follows.

Wait State.
Interaction Initiation State.
Driver Interaction State.
Interaction Termination State The transition between the different states of the VTOS is summarized as follows.

The VTOS is in a default Wait State when there is no driver in the vicinity of the system. When a vehicle approaches and is parked nearby the system and a driver is detected by the face/vehicle detection technology, the Interaction Initiation State starts. At the Interaction Initiation State, the VTOS can display a welcome message or brief introduction about how to use the system. The image-capturing system for hand detection and tracking, either left or right hand, analyzes the driver's movements and gestures. A plurality of images from the image-capturing system of the VTOS is analyzed by a processing and controlling system to interpret the user's actions, such as position of the limbs (hand, arm, etc.) and gestures (defined by temporal location of the limbs or particular postures).

For the face detection, any robust, reliable, and efficient face detection method can be used. In U.S. Pat. No. 6,184,926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment of the invention, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23–38, January 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130–136, 1997 explains about the SVM based face detection approach in more details.

The VTOS detects the vehicle and the position of the vehicle window, which is used to define the Maximum Interaction Range Volume and the Optimal Interaction Volume, which is the region in real world 3D space that is tracked and mapped to find the hand location. The maximum interaction range volume and the optimal interaction volume of the VTOS are virtual space, which change according to the physical dimension of the driver and the vehicle. Since the volumes change according to the position of the driver and vehicle, some degree of freedom for the motion is possible. This is helpful and necessary for the contact-free interaction process by the VTOS, because the vehicles can be parked in random position within the vicinity of the VTOS units.

The maximum interaction range volume shows the maximum range, in which the driver can interact with the VTOS. The VTOS is able to detect and enable the driver's hand gesture for the contact-free interaction within this region. However, in most cases, the driver will feel comfortable in interacting with the VTOS within the optimal interaction volume because of the physical limitation in the range of movement a driver can reach with his or her hand. The optimal interaction volume is a sub volume that is located according to the position of the window of the vehicle in the maximum interaction range volume. This volume will preferably be located such that the user can use either the left or the right hand in a natural way.

When the driver actually engages with the Driver Interaction State, the VTOS provides the digital content for taking orders or completing transactions through the display system. The user points with his hand to the screen to make selections among the displayed digital content. The design of the digital content widely depends on the owner or designer of the particular embodiment of the VTOS, since the VTOS can be used for any drive-thru interaction, such as taking orders and completing transactions in a drive-thru bank, photo center, and quick service restaurant. Generally the overall content of the VTOS comprises a welcome message, plurality of selection screens and main content, and the exit screen. When the customer points to the display with his or her hand, the VTOS shows a visual feedback on the screen of the display system to the user as to where the system is interpreting the hand location.

The contact-free interface can be implemented using any of the reliable real-time gesture recognition technology in the computer vision. One example of the contact-free interface is explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002.

When the user finishes the interaction, the VTOS goes into the Interaction Termination State. In this state, the VTOS can display a brief parting message, such as "Thank you. Come again!" message, confirmation message, or any relevant content, which signals to the user the end of the interaction and lets the driver know what to do next as the result of the final interaction, such as displaying "Proceed to the next window!" message or "Be careful when you exit!" message. When the interaction is terminated, the VTOS goes back to the initial Wait State and looks for the next driver.

Additional features of the VTOS are summarized as follows.

The location and number of the image-capturing system and the location of the display system for the present invention could be in multiple places around the vehicle as long as the driver is able to see the display system and the VTOS can see the driver's hand motion. The system can track the hand of the user when it is located outside or inside the vehicle, therefore giving the option to the user of interacting with the display without opening the vehicle window.

Different types of vehicles could have different heights. Different drivers in the same type of vehicle can also have different heights. In order to make the virtual touch interaction more comfortable and reliable, the VTOS can adjust the height of the display region according to the level of eyesight of the driver using the computer vision technology. Using the eye level, the main content can be positioned in the corresponding level within the display screen. The other parts of the display screen, where the main content is not shown, can be used for advertisement or promotional display. The VTOS also detects if the user is looking at the display, and further instructions can be presented only if the user is looking at the display to ensure the customer's attention.

The VTOS is able to collect data using computer vision algorithms and analyze the results of the ordered items and customer behaviors in selection processes, which can be saved after customers finish the interaction of giving orders and other transactions.

The data gathering services utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. These services include detection of customers, their classification into segments based on demographics, and the capture of information about their interaction with the VTOS. The exemplary statistics gathered by the VTOS can include;

- the amount of time that is spent to finish the interaction in the drive-thru;
- the division of people in demographic groups, including gender, race, broad age group;
- the traffic measurement, such as traffic composition by time of day, day of week, and demographic shifts; and the customer behavior, such as the time spent at a particular item selection screen or whether the purchases are made or not.

So far a single housing unit model of the VTOS is summarized. However, the VTOS can also comprise multiple housing units, which are organized in pipeline and/or parallel in order to perform multiple transactions at the same time, similar to the schemes of a gas station. Overall, this model increases the throughput of the drive-thru, decreasing the average wait time per customer. For the case of certain transactions, such as the bank transaction, which could specifically require human attendant's involvement, the design of the VTOS could be modified in a way such as to minimize the number of attendants.

DRAWINGS—FIGURES

DETAILED DESCRIPTION OF THE INVENTION

Figure 1:
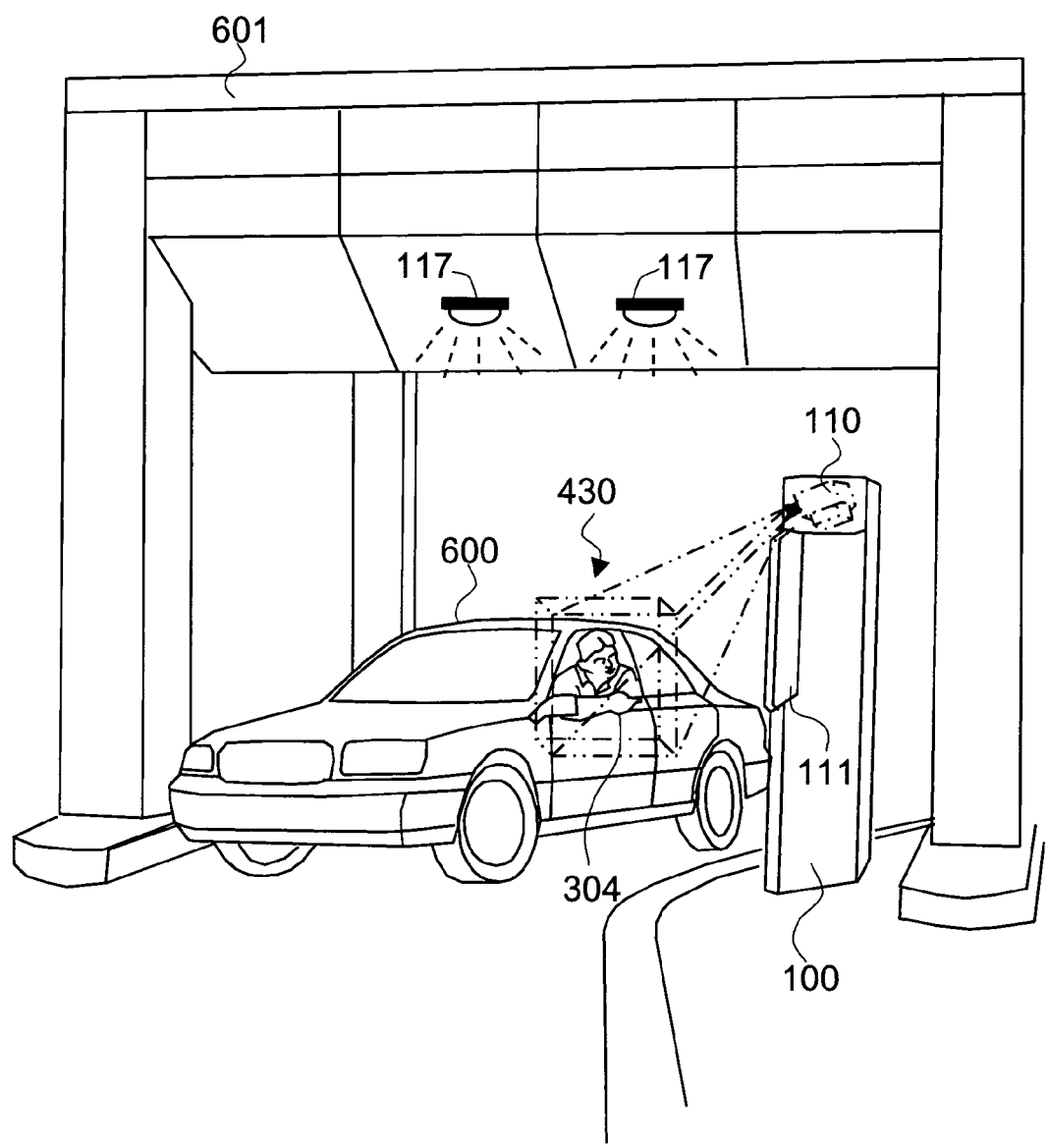
FIG. 1 is an overall view of the VTOS.

FIG. 1 shows the overall view of the VTOS. In this particular exemplary embodiment shown in FIG. 1, the VTOS consists of a housing (enclosure) 100, plurality of the image-capturing system 110, a display system 111, and a sound system 113 (hidden in the enclosure). The processing and controlling system 112 is connected to these peripheral sub-systems, such as the image-capturing system 110, the display system 111, and the sound system 113, as in the exemplary embodiment shown in FIG. 2. The image-capturing system 110 is defined to be a system with plurality of image-capturing devices, such as cameras, frame grabbers and all relevant peripherals, in the VTOS. The processing and controlling system 112 can be installed inside the housing 100 in the exemplary embodiment shown in FIG. 1, or it can be installed in a remote place within the restaurant building or any of its surrounding areas, where the system can be securely and efficiently placed. The owner or designer of the particular VTOS can decide how the processing and controlling system 112 is connected with the peripheral sub-systems. If the owner or designer of the particular VTOS chooses to have the conventional vocal drive-thru interaction method as one of the interaction options for the customers, a microphone can be attached to the VTOS. It can be used as one of the input modalities although it will be the secondary interaction modality in the VTOS. As in the exemplary embodiment shown in FIG. 1, the VTOS allows the customer inside a vehicle 600 select the items from the main digital content displayed through the display system 111 of the VTOS using the contact-free interface 304 within the interaction volume 430. Lighting system 117 and drive-thru ceiling structure 601 help the VTOS to process the user detection and the contact-free interaction 304 by helping computer vision technology operate more reliably. The lighting system 117 and the drive-thru ceiling structure 601 is not the essential part of the VTOS, but they belong to the VTOS as the environmental set up, in a broader concept.

Figure 2:
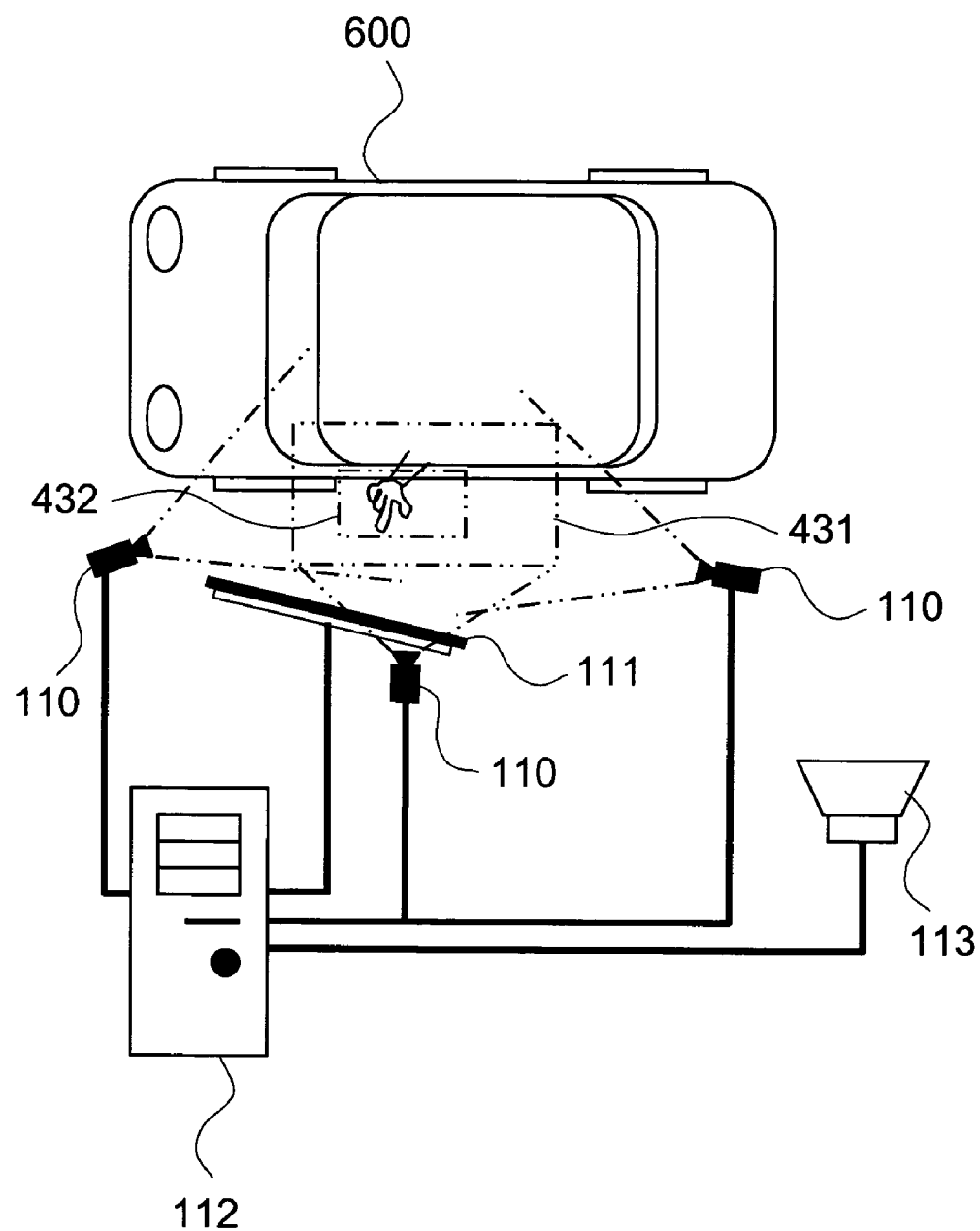
FIG. 2 is an overall view of the VTOS from the top.

FIG. 2 is a view of the VTOS and a driver interacting with it, as viewed from the top. As in the exemplary embodiment shown in FIG. 2, the apparatus of the invention could comprise the processing and controlling system 112, a display system 111, a sound system 113, and one or more visual sensors, the plurality of the image-capturing system 110. In this particular embodiment, two image-capturing systems are used for hand detection and tracking, either left or right hand, and one for human face detection and tracking. FIG. 2 also shows the virtual components of the system, which are the Maximum Interaction Range Volume 431, and the Optimal Interaction Volume 432. These volumes are explained in more detail in FIG. 5. To use the system more efficiently, it is desirable to have the vehicle 600 parked as close to the display as possible, so that the Maximum interaction range volume 431 contains the range of hand movements in real world coordinates.

Once the vehicle 600 is parked in the vicinity of the system, a driver is detected by the face detection technology. For the face detection, any robust, reliable, and efficient face detection method can be used. In U.S. Pat. No. 6,184,926 of Khosravi et al. and U.S. Pat. No. 6,404,900 of Qian et al., the authors disclosed methods for human face detection. In M. H. Yang, D. J. Kriegman, and N. Ahuja, "Detecting Faces in Images: A Survey," IEEE Trans. Pattern Analysis and Machine Intelligence, vol. 24, no. 1, January 2002, the authors describe various approaches for the face detection. In the exemplary embodiment, a neural network based face detector or SVM based face detection method may be used. H. Rowley, S. Baluja, and T. Kanade, "Neural Network-Based Face Detection," IEEE Trans. Pattern Analysis and Machine Intelligence, vol. 20, no. 1, pp. 23–38, Jan. 1998, explains about the neural network based face detector in more details. E. Osuna, R. Freund, and F. Girosi, "Training Support Vector Machines: An Application to Face Detection," Proc. IEEE Conf. Computer Vision and Pattern Recognition, pp. 130–136, 1997 explains about the SVM based face detection approach in more details.

At this state, the image-capturing systems 110 for hand detection and tracking analyze the driver's movements and gestures. The VTOS detects the vehicle 600 and the position of the window, which is used to define the optimal interaction volume 432 that is the region in real world 3D space that is tracked and mapped to find the hand location. Other information obtained from the image-capturing system 110 is the height of the vehicle 600, which is used to modify the information presented on the display, or the location of the display itself, in order to gain comfort for the user to watch and interact. By means of the image-capturing system 110 for face, the VTOS detects if the user is looking at the display, and consequently starts a short salutation and instruction video. Further instructions can also be presented only if the user is looking at the display.

The location and number of the image-capturing systems 110 and the location of the display system 111 for the present invention could be different from those shown in the exemplary embodiment in FIG. 2. An alternative location for the display can be in front of the windshield of the vehicle 600. In this embodiment, the sensors, image-capturing system 110, could be located in front of the vehicle 600, and the user can interact from the inside of the vehicle 600 using the contact-free interaction 304 without opening a window.

When the customer points to the display with his or her hand, the VTOS shows a visual stimulus on the display screen that provides feedback to the user as to where the system is interpreting the hand location. Then the user can point to region of the screen to select items. For the exemplary embodiment, the selection can be made by pointing to the same location and holding the hand for a pre-defined period of time (e.g.: 1 second). The display system screen will display a Graphical User Interface (GUI) with selectable areas such as buttons. The contact-free interface allows the user to make selections using the GUI. The contact-free interface can be implemented using any of the reliable real-time gesture recognition technology in the computer vision. The exemplary embodiment of the VTOS shown in FIG. 2 can use the contact-free interaction 304 method explained in detail by R. Sharma, N. Krahnstoever, and E. Schapira, "Method and System for Detecting Conscious Hand Movement Patterns and Computer-generated Visual Feedback for Facilitating Human-computer Interaction", U.S. Provisional Patent 60/369,279, Apr. 2, 2002. The content of the screen widely depends on the particular embodiment of the VTOS.

Figure 3:
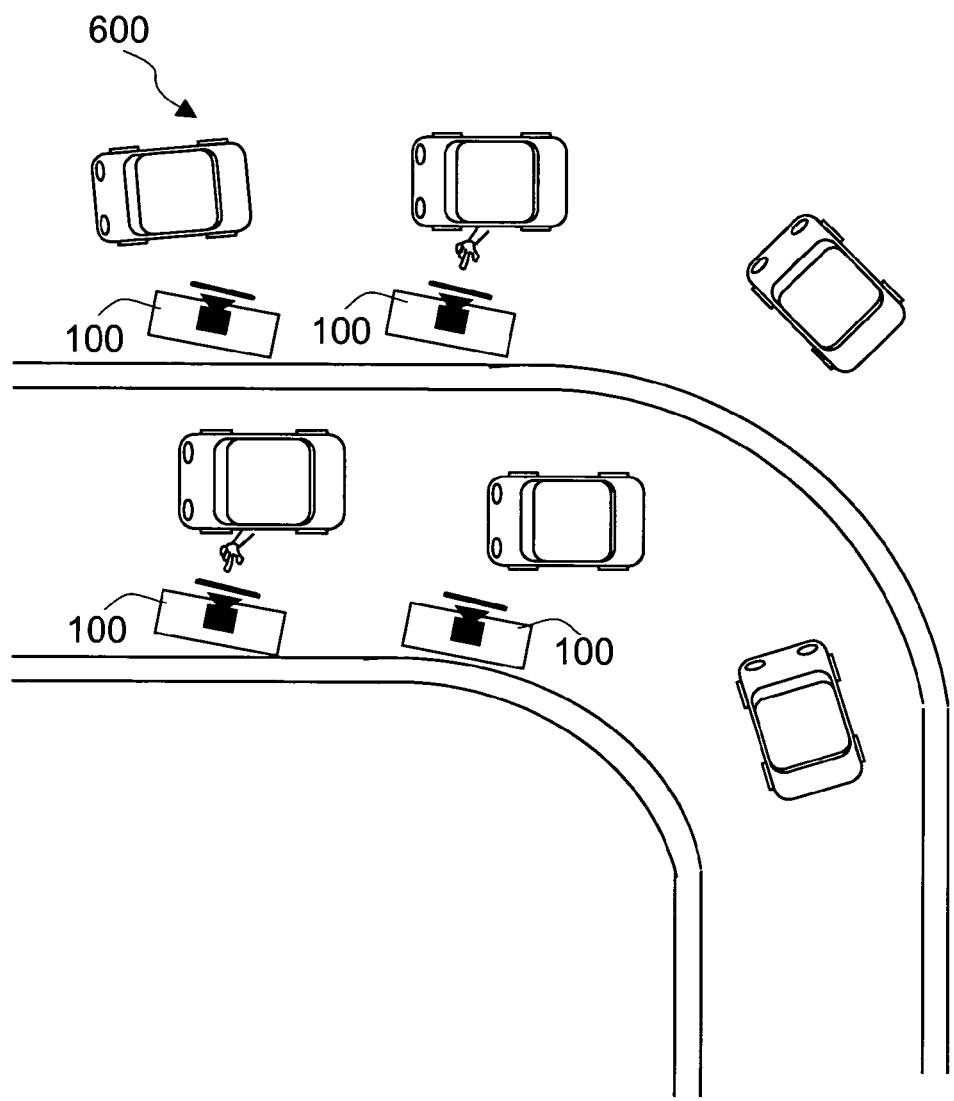
FIG. 3 is a model of VTOS representing multiple units of the housing, organized in pipeline and parallel in order to perform several transactions at the same time.

FIG. 3 shows another exemplary embodiment of the VTOS. As shown in FIG. 3, the VTOS could comprise multiple housing units 100, which are organized in pipeline and/or parallel in order to perform multiple transactions at the same time, similar to a gas station. This model increases the overall throughput of the drive-thru, decreasing the average wait time per customer. One of the difficulties of having pipelined and parallel drive-thru units in the conventional drive-thru system with voice only interaction was the cost of hiring as many attendants or order takers as the number of the drive-thru interaction units. However, with the exemplary embodiment of the pipelined and parallel model of the VTOS shown in FIG. 3, extra cost for hiring more attendants or order takers is not necessary. Virtually, no human labor is needed with the VTOS for taking orders and most transactions. All the orders and transactions can be made by the plurality of the VTOS units 100 and these interaction results are sent to the people in the building, such as the food preparation team of the quick service restaurant, directly through the central server and its results on monitor screen inside the relevant building.

For the case of certain transactions, such as the bank transaction, which could specifically require human attendant's involvement, the design of the VTOS could be modified in a way such as to minimize the number of attendants. For example, a window with human attendant can be dedicated for the specific transaction, which requires human labor, as it is done now in the conventional drive-thru systems, and allow the plurality of the VTOS units to other parts of the drive-thru facility for the automated drive-thru interactions. This will increase the overall throughput of the drive-thru and decrease the average wait time per customer.

In the exemplary pipelined and parallel model of the VTOS shown in the FIG. 3, the sequence of the final interaction from the plurality of the units could be random. For example, in the exemplary pipelined and parallel model of the VTOS shown in the FIG. 3, any one of the 4 drivers in the vehicles 600 interacting with the VTOS units could finish the interaction first. The second, the third, and the fourth final interaction could be from any of the rest of the VTOS units, depending on the particular drivers' interaction behaviors, such as the individuals' various desire for specific items on the selection choices and personal interaction time with the VTOS unit. These random interaction results can be received in a central server according to the timed final interaction sequences and processed in the sequence in which they are received.

For this particular model of VTOS, how to proceed to the next window, such as payment and pickup window, from the interaction (ordering) station has to be designed carefully in order to avoid the traffic in the interval between the interaction (ordering) station and the next window, (payment and pickup window). The methods of such control can be varied depending on the setup of the particular restaurant, such as the number of the payment window and the number of the pickup window. For example, when there is a single payment window and a single pickup window, (they could be further combined in one window), the vehicles 600 can be released from the interaction (ordering) station in the order the interactions (orders) are made. For this approach, physical structures, such as light signals attached to the VTOS unit, could be used to signal the vehicle 600 to proceed to the payment and pickup window. The display system 111 of the VTOS could also be used as the traffic controller, by displaying traffic control messages, such as "Please, Wait!" or "Please, Move forward!" When there are multiple payment windows and multiple pickup windows, the vehicles 600 in each pipeline can be released to its own payment window and pickup window, designated to the specific pipeline. However, for this method, additional cost for having multiple windows and food conveyer system might be needed.

Overall the exemplary pipelined and parallel model of the VTOS shown in the FIG. 3 may require more physical space, where the vehicle 600 access to the interaction (ordering) station and out of the interaction (ordering) station should be possible very easily, so that multiple drivers can park their vehicles 600 and interact with the VTOS. However, the maximum interaction range volume 431 and the optimal interaction volume 432 of the VTOS, which will be explained later, allow some degree of freedom to the driver for parking and interaction with the VTOS units.

Figure 4:
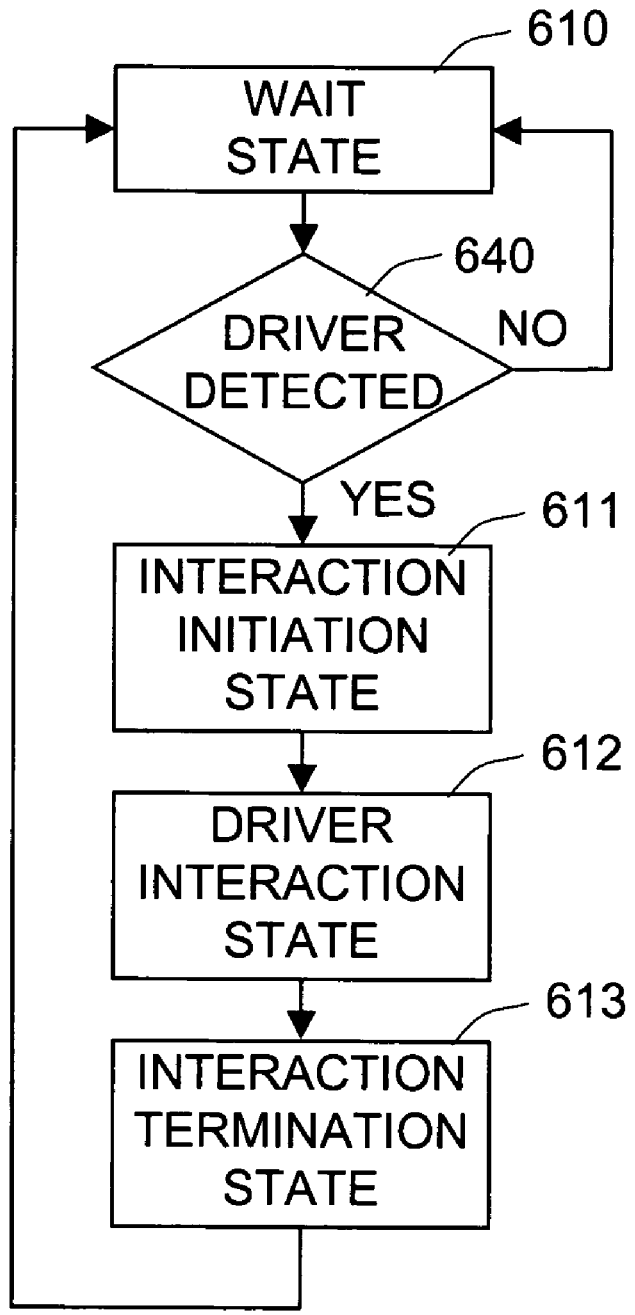
FIG. 4 is a state diagram of the VTOS, which shows the processes according to the driver interaction.

FIG. 4 is a state diagram of the VTOS, which shows the processes according to the driver interaction. The VTOS is in a default Wait State 610 when there is no driver in the vicinity of the system. When a vehicle 600 is parked nearby the system and a driver is detected 640 by the face detection of the computer vision technology, the Interaction Initiation State 611 is started. At the Interaction Initiation State 611, the VTOS can display welcome message or brief introduction about how to use the system. When the driver actually engages to the Driver Interaction State 612, the VTOS provides the digital content for ordering or transaction through the display system 111. When the user finishes the interaction, the VTOS goes into the Interaction Termination State 613. In this state, the VTOS can display a brief parting comment like "Thank you. Come again!" message or any relevant content, which signals the user to the end of the interaction and lets the driver know what to do next as the result of the final interaction, such as displaying "Proceed to the next window!" message. When the interaction is terminated, the VTOS goes back to the initial Wait State 610 and prepares for the next driver.

Figure 5:
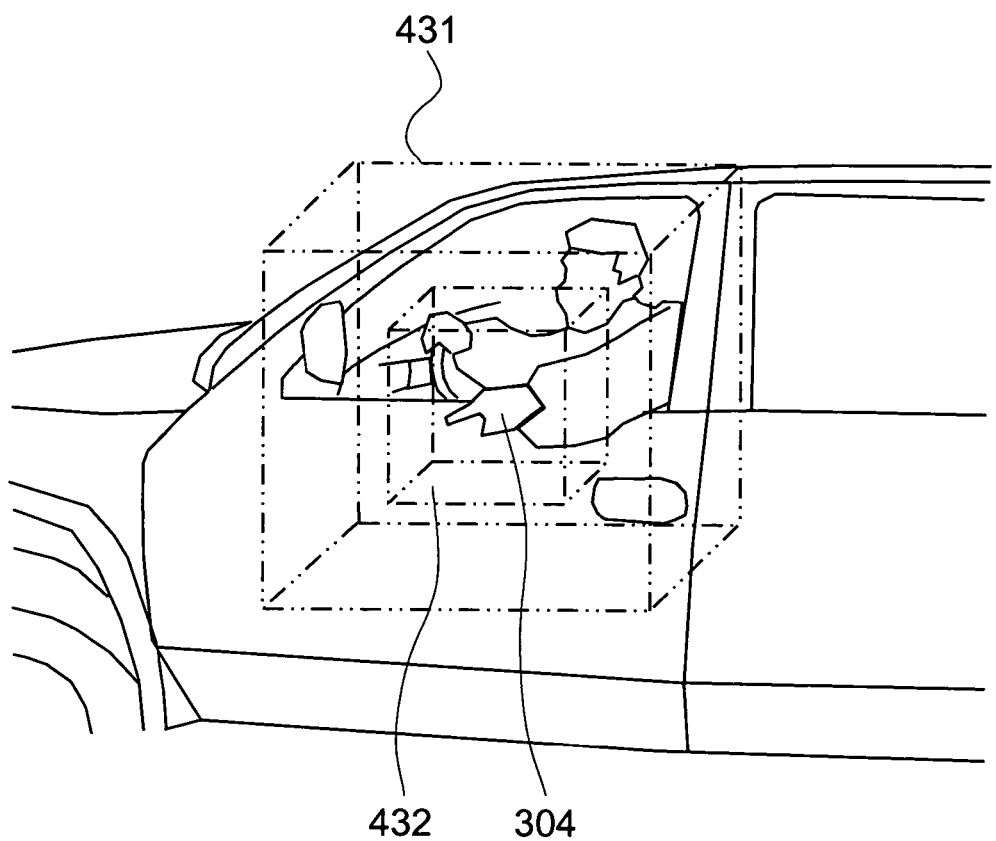
FIG. 5 shows the exemplary Maximum Interaction Range Volume and the exemplary Optimal Interaction Volume of the VTOS.

FIG. 5 shows the exemplary maximum interaction range volume 431 and the exemplary optimal interaction volume 432 of the VTOS. The maximum interaction range volume 431 and the optimal interaction volume 432 of the VTOS are virtual space, which change according to the physical dimension of the driver and the vehicle 600. The position and size of the virtual spaces can be approximated by the relevant position of the user and the size of the vehicle 600 window.

Since the volumes change according to the position of the driver and vehicle 600, some degree of freedom for the motion is possible. This is helpful and necessary for the contact-free interaction 304 and the overall interaction process by the VTOS, because the vehicles 600 can be parked in random position within the vicinity of the VTOS units. If the image-capturing system 110 is static, the maximum interaction range volume 431 can reside within the field of view 320 of the image-capturing system 110. If the image-capturing system 110 is dynamic, which can dynamically adjust the pan and tilt of the image-capturing device, the maximum interaction range volume 431 can extend further.

The maximum interaction range volume 431 shows the maximum range, in which the driver can interact with the VTOS. The maximum interaction range volume 431 is used to define the total area that can be used to track the face and hand. It is approximately located within the intersection of the image-capturing system 110 field of views 320, which in turn is defined by the orientation and field of view 320 of the image-capturing system 110 for the hand detection and tracking. The VTOS is able to detect and enable the driver's hand gesture based contact-free interaction 304 within this region. However, in most cases, the driver will feel comfortable in interacting with the VTOS within the optimal interaction volume 432 because of the physical constraints. There is a limitation in the range of movement a driver can reach with his or her hand, so the optimal interaction volume 432 are decided by the position of the driver's face, where the person could interact with the VTOS comfortably.

Figure 6:
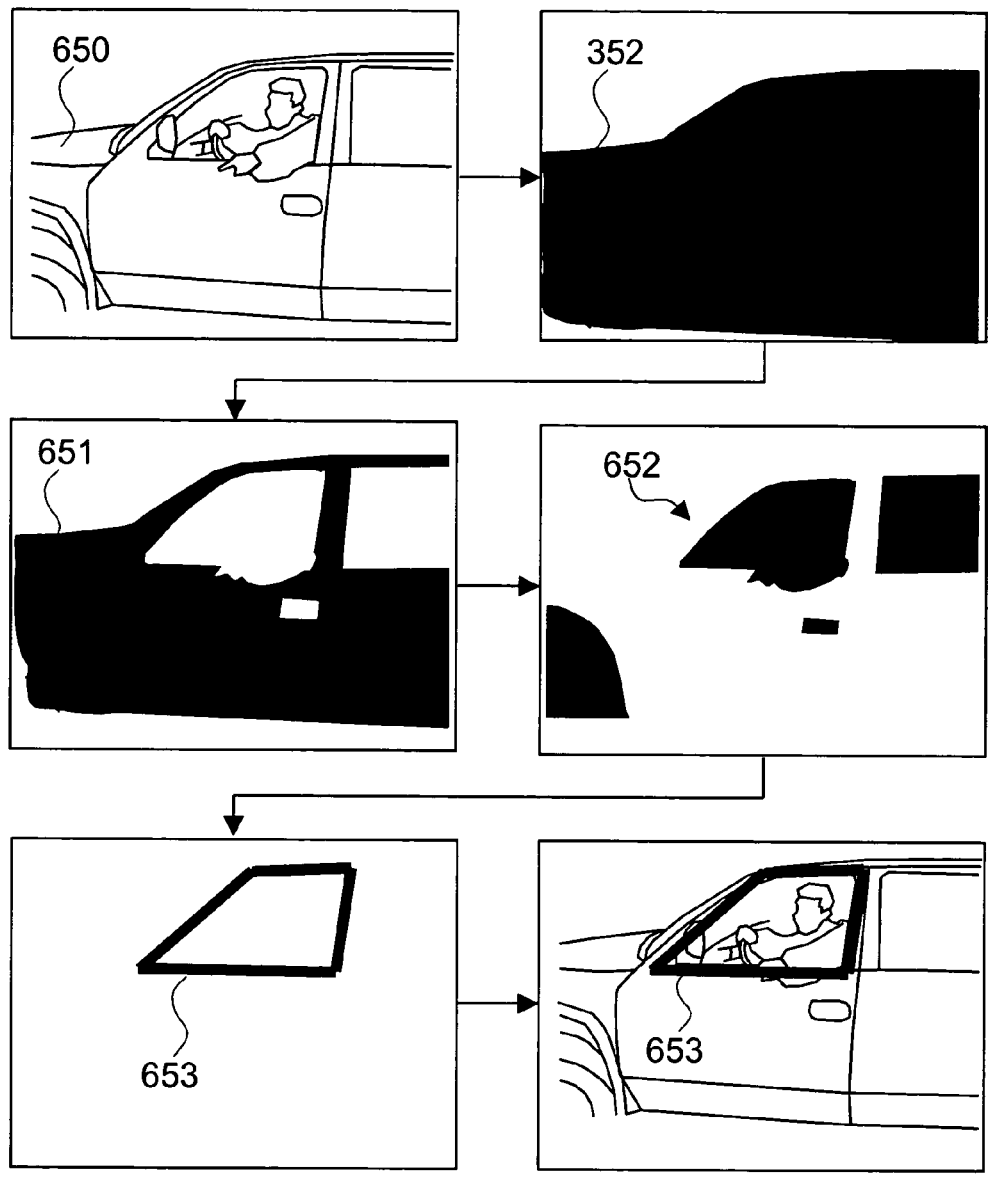
FIG. 6 shows an exemplary method for vehicle detection for the VTOS.

The optimal interaction volume 432 is mainly used to detect the hand position, and the contact-free interaction 304 is accomplished within this volume. It is a sub volume that is located according to the position of the window of the vehicle 600 in the maximum interaction range volume 431. If no window is present, the volume will be located according to the head position of the customer. To detect the position of the window, the vehicle 600 is analyzed by a computer vision technology as shown in FIG. 6. The silhouette 352 of the vehicle image 650 is determined using background subtraction. In the C. Stauffer and W. E. L Grimson, Adaptive Background Mixture Models for Real-Time Tracking, In Computer Vision and Pattern Recognition, volume 2, pages 246–253, June 1999, the authors describe a method for modeling background in more detail. Using the silhouette 352 and knowledge about typical vehicle geometries, the main color of the vehicle 651 is determined from the front section of the vehicle 600. With the knowledge about the vehicle's color 651, those regions of the vehicle silhouette 352 that do not have the same color as the vehicle 600 can be determined 652. What remain are different parts of the vehicle 600 that do not share the same color as the body of the vehicle 600, such as the wheels and the window region 653. Finally, using edge detection and prior geometrical knowledge, the region that constitutes the driver window 653 is determined.

Then, the location and size of the optimal interaction volume 432 will be defined to optimize ergonomics (i.e., comfort and efficiency). This volume will preferably be located such that the user can use either the left or the right hand in a natural way.

Figure 7:
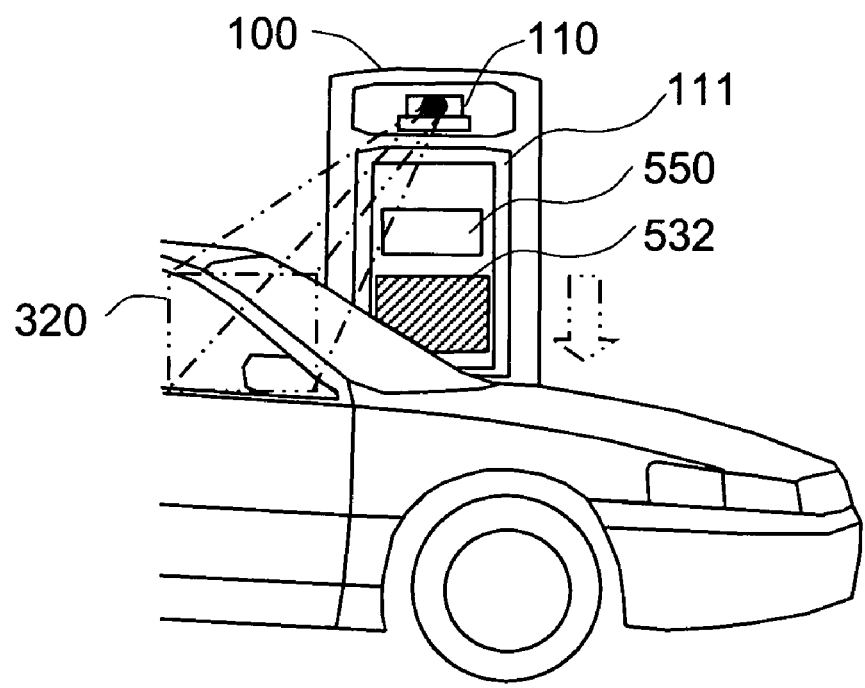
FIG. 7 shows that VTOS dynamically changes the digital content display region within the vertically elongated display system using the height detection capability.
Figure 7:
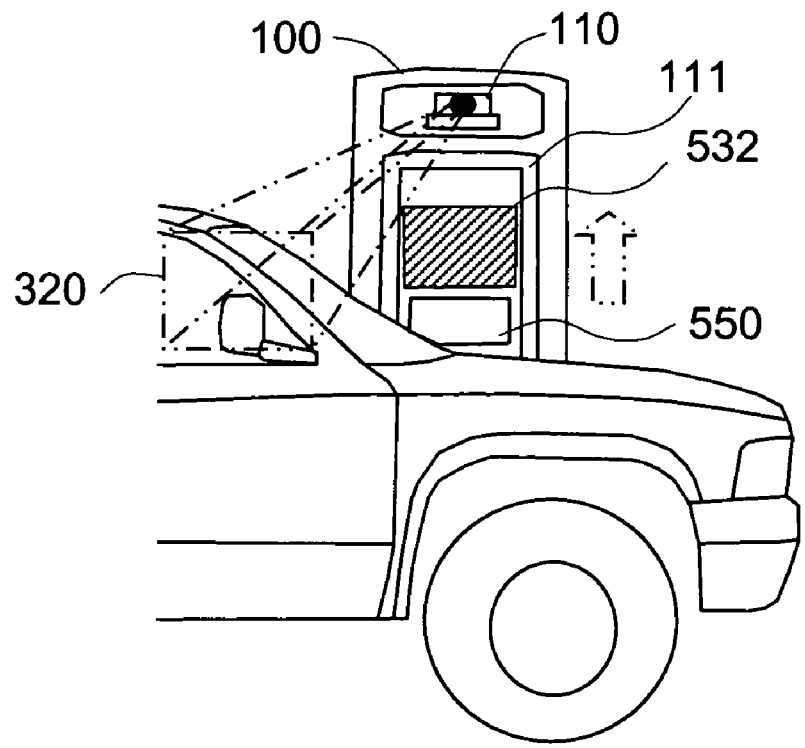

FIG. 7 shows the VTOS dynamically changes the digital content display region within the vertically elongated display system 111 using the height detection capability.

The VTOS system can adjust the main content display region 532 in the display system 111 according to the user's height. Different type of vehicles 600 could have different heights. For example, the passenger cars usually have a lower height than SUVs (Sports Utility Vehicle). Different drivers in the same type of vehicle 600 can also have different heights. In order to make the virtual touch interaction more comfortable and reliable, the VTOS can adjust the height of the digital display region according to the level of eyesight of the driver in the field of view 320 using the computer vision technology, such as the face detection. For this functionality, the enclosure 100 of the VTOS can be equipped with vertically elongated display screens. For example, the display system 111 can position the display screen in a portrait style or use plurality of the normal display screens in a landscape style put together on top of another, in which the plurality of the display screens eventually make the entire screen a portrait style display screen. Using the eye level of the user, the main content display region 532 can be positioned in the corresponding level within the display screen. The other parts 550 of the display screen, where the main content is not shown, can be used for advertisement or promotional display for cross selling and up selling.

Figure 8:
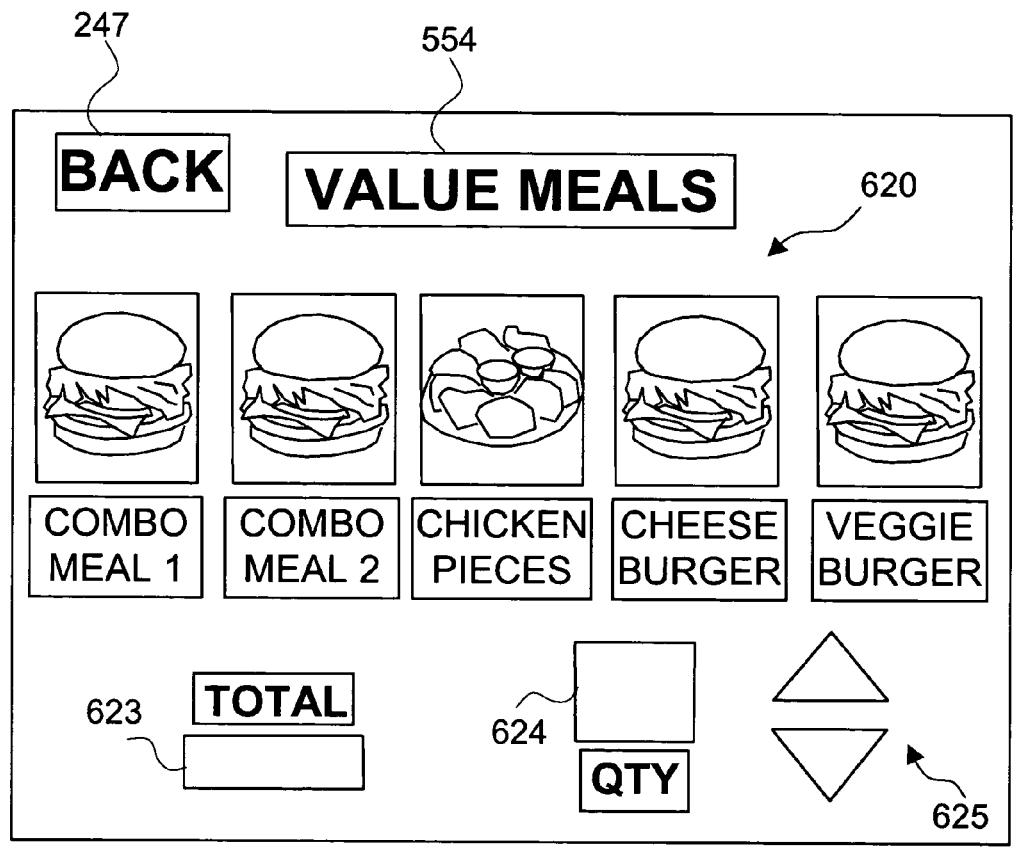
FIG. 8 shows an exemplary screen shot of the digital content of the VTOS in the context of Quick Service Restaurant.
Figure 9:
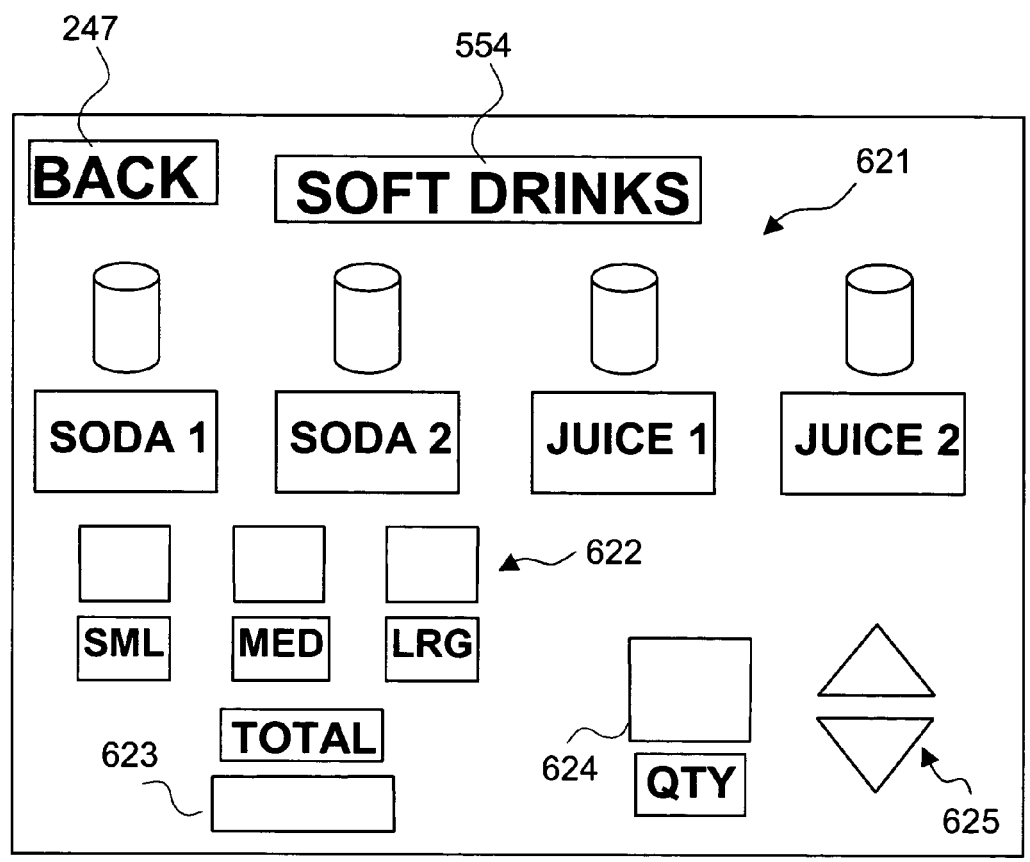
FIG. 9 shows another exemplary screen shot of the digital content of the VTOS in the context of Quick Service Restaurant.

The design of the digital content widely depends on the owner or designer of the particular embodiment of the VTOS. The VTOS can be used for any drive-thru interaction, such as completing orders and transactions in a drive-thru bank, photo center, and quick service restaurant. Generally the overall content of the VTOS comprises welcome message, plurality of selection screens, and the exit screen. FIG. 8 shows an exemplary screen shot of the digital content of the VTOS in the context of quick service restaurant. FIG. 9 shows another exemplary screen shot of the digital content of the VTOS in the context of quick service restaurant.

In order to make the selection process more customizable, the maneuver button such as the back button 247 can be added. The title 554 could show the current position within the selection process. It could contain the conventional fast-food ordering items, such as food menu buttons 620 and soft drink menu buttons 621. Quantity of the items 624, size of the items 622, and total 623 of the ordered food can be shown to the user also. The user is able to change the quantity of the items using the quantity change buttons 625. The digital display contents clearly help the customers what they ordered. They can cancel and go back to the previous menu and make changes in their order. The selection process is done by the contact-free interaction 304. Through the contact-free interaction 304, the user is able to experience a new and exciting way of interacting with the ordering and transaction system. The buttons have to be easily noticeable as selectable items on the screen, to the customers.

After the customer completes the interaction, ordering or transactions, the VTOS can provide an exit screen. The content of the exit screen can be in any form, which informs the customer the end of the interaction, such as "Thank you. Come again!" message or "Proceed to the Payment and Pick up Window!" message.

The VTOS is able to collect the data using the computer vision algorithms, such as demographic classification, and analyzing the results of the ordered items and customer behaviors in selection processes, which can be saved after customers finish the interaction of making orders and transactions. This is the implicit way of collecting the data about the user, without requiring any user involvement in the data collection.

The data gathering services utilize computer vision technologies to provide visibility to customer traffic, composition, and behavior. This is explained in detail by R. Sharma and A. Castellano, "Method for augmenting transaction data with visually extracted demographics of people using computer vision", U.S. Provisional Patent, 60/402,817, Aug. 12, 2002, and by R. Sharma and T. Castellano, "Automatic detection and aggregation of demographics and behavior of people using computer vision", U.S. Provisional Patent, 60/399,246, Jul. 29, 2002. These services include detection of customers, their classification into segments based on demographics, and the capture of information about their interaction with the VTOS. The exemplary statistics gathered by the VTOS can include;

the amount of time that is spent to finish the interaction;
the division of people in demographic groups, including gender, race, broad age group;
the traffic measurement, such as traffic composition by time of day, day of week, and demographic shifts; and
the customer behavior, such as the time spent at a particular item selection screen or whether the purchases are made or not.

This data collection in the VTOS enables immediate feedback of marketing initiatives, better understanding of customer behavior, and automated means of measurement. Retailers are constantly seeking to unlock the secrets to customer behavior, captivating them with meaningful communications in order to convert them into buyers of products and services. The data collection based on the computer vision technologies in the VTOS can provide the solutions for this business needs to make informed business decisions. The VTOS goes back to the initial Welcome Screen and starts look for next customer after the final interaction is made.

While the invention has been illustrated and described in detail, in the drawings and foregoing description, such an illustration and description is to be considered as exemplary and not restrictive in character, it being understood that only the preferred embodiment has been shown and described and that all changes and modifications that come within the spirit of the invention are desired to be protected.

We claim:

1. A method for interacting with a service system from inside a vehicle without physical contact with the system, comprising steps of:
   (a) showing visual information on a display,
   (b) capturing a plurality of input images of a person, who wants to use the system, and the vehicle in which said person is sitting,
   (c) processing said plurality of input images in order to extract motion information in a contact-free manner,
   (d) performing interaction based on the extracted motion information that allows said person to interact with the shown visual information, and
   (e) processing the interaction results of said person with said service system,
   wherein the step of performing contact-free interaction is possible regardless whether said vehicle's window is open or closed.

2. The method according to claim 1, wherein the step of processing the interaction results involves updating said visual information on a display when said person is looking at the display system.

3. The method according to claim 1, wherein the step of showing visual information on a display further comprises a step for showing elements that can be selected or manipulated by the contact-free interaction,
   whereby said visual information can be shown on an electronic display or on a static display board,
   whereby said visual information shows products or food items for purchase, and
   whereby exemplary embodiments of said elements can be menus, graphical depictions of buttons, and icons.

4. The method according to claim 1, wherein the step of capturing said plurality of input images of the person and the contact-free interaction further comprises a step for using one or a plurality of image-capturing devices for the capturing.

5. The method according to claim 1, wherein the contact-free interaction further comprises a step for allowing a certain degree of spatial freedom in parking said vehicle and interacting with the system by said person,
   whereby the spatial freedom can be realized in an exemplary maximum interaction range volume and an exemplary optimal interaction volume in a virtual space, which change according to the physical dimension of the person in the vehicle and the vehicle.

6. The method according to claim 1, wherein the method further comprises a step for adjusting the main content display region in the display system according to the vehicle's parking position and said person's height, whereby the adjustment makes said person easier to interact with the system even if various vehicle have different heights depending on the type of the vehicle, and whereby the other parts of the display screen, where the main content is not shown, can be used for advertisement or promotion.

7. The method according to claim 1, wherein the step of processing the interaction results further comprises a step for collecting a plurality of data about said person and the interaction, whereby exemplary statistics gathered by the data collection can include, the amount of time to finish the interaction, the division of people in demographic groups, the traffic measurement, such as traffic composition by time of day, day of week, and demographic shifts, and the customer behavior, such as the time spent at a particular item selection screen or whether purchases are made or not.

8. The method according to claim 1, wherein the step of processing said plurality of input images in order to extract motion information in a contact-free manner further comprises a step for processing the detection of said person's vehicle and a localization of the vehicle window.

9. The method according to claim 1, wherein the step of processing said plurality of input images in order to extract motion information in a contact-free manner further comprises a step for performing face detection and hand tracking.

10. The method according to claim 1, wherein the step of performing interaction further comprises a step for allowing said person to purchase food items or non-food items, such as pharmaceuticals, or where it is designed to provide services, such as banking, using the contact-free interface.

11. An apparatus for interacting with a service system from inside a vehicle without physical contact with the system, comprising:
(a) means for showing visual information,
(b) means for capturing a plurality of input images of a person, who wants to use the system, and the vehicle in which said person is sitting,
(c) means for processing said plurality of input images in order to extract motion information in a contact-free manner,
(d) means for performing interaction based on the extracted motion information that allows said person to interact with the shown visual information, and
(e) means for processing the interaction results of said person with said service system,
wherein the means for performing contact-free interaction is possible regardless whether said vehicle's window is open or closed.

12. The apparatus according to claim 11, wherein the means for processing the interaction results involves updating said visual information when said person is looking at the means for showing visual information.

13. The apparatus according to claim 11, wherein the means for showing visual information further comprises means for showing elements that can be selected or manipulated by the contact-free interaction, whereby said visual information can be shown on means for electronic display or means for static display, whereby said visual information shows products or food items for purchase, and whereby exemplary embodiments of said elements can be menus, graphical depictions of buttons, and icons.

14. The apparatus according to claim 11, wherein the means for capturing said plurality of input images of the person and the contact-free interaction further comprises means for using one or a plurality of image-capturing devices for the capturing.

15. The apparatus according to claim 11, wherein the contact-free interaction further comprises means for allowing a certain degree of spatial freedom in parking said vehicle and interacting with the system by said person, whereby the spatial freedom can be realized in an exemplary maximum interaction range volume and an exemplary optimal interaction volume in a virtual space, which change according to the physical dimension of the person in the vehicle and the vehicle.

16. The apparatus according to claim 11, wherein the apparatus further comprises means for adjusting the main content display region in the means for showing visual information according to the vehicle's parking position and said person's height, whereby the adjustment makes said person easier to interact with the system even if various vehicle have different heights depending on the type of the vehicle, and whereby the other parts of the display screen, where the main content is not shown, can be used for advertisement or promotion.

17. The apparatus according to claim 11, wherein the means for processing the interaction results further comprises means for collecting a plurality of data about said person and the interaction, whereby exemplary statistics gathered by the data collection can include, the amount of time to finish the interaction, the division of people in demographic groups, the traffic measurement, such as traffic composition by time of day, day of week, and demographic shifts, and the customer behavior, such as the time spent at a particular item selection screen or whether purchases are made or not.

18. The apparatus according to claim 11, wherein the means for processing said plurality of input images in order to extract motion information in a contact-free manner further comprises means for processing the detection of said person's vehicle and a localization of the vehicle window.

19. The apparatus according to claim 11, wherein the means for processing said plurality of input images in order to extract motion information in a contact-free manner further comprises means for performing face detection and hand tracking.

20. The apparatus according to claim 11, wherein the means for performing interaction further comprises means for allowing said person to purchase food items or non-food items, such as pharmaceuticals, or where it is designed to provide services, such as banking, using the contact-free interface.

* * * * *